United States Patent
Goshima

(10) Patent No.: US 11,401,414 B2
(45) Date of Patent: Aug. 2, 2022

(54) FLAME-RETARDANT POLY(BUTYLENE TEREPHTHALATE) RESIN COMPOSITION

(71) Applicant: POLYPLASTICS CO., LTD., Tokyo (JP)

(72) Inventor: Kazuya Goshima, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 16/640,430

(22) PCT Filed: Aug. 21, 2018

(86) PCT No.: PCT/JP2018/030792
§ 371 (c)(1),
(2) Date: Feb. 20, 2020

(87) PCT Pub. No.: WO2019/039462
PCT Pub. Date: Feb. 28, 2019

(65) Prior Publication Data
US 2020/0354565 A1    Nov. 12, 2020

(30) Foreign Application Priority Data
Aug. 22, 2017   (JP) .............................. JP2017-159369

(51) Int. Cl.
  *C08L 67/02*   (2006.01)
  *C08J 3/20*    (2006.01)
  *C09K 21/14*   (2006.01)

(52) U.S. Cl.
  CPC .............. *C08L 67/02* (2013.01); *C08J 3/203* (2013.01); *C09K 21/14* (2013.01); *C08L 2201/02* (2013.01)

(58) Field of Classification Search
  CPC ....... C08L 67/02; C08L 2201/02; C08J 3/203; C08J 3/21; C08J 3/215; C09K 21/00; C09K 21/06; C09K 21/08; C09K 21/14
  See application file for complete search history.

(56) References Cited

U.S. PATENT DOCUMENTS

| | | | |
|---|---|---|---|
| 4,128,709 A | 12/1978 | Vollkommer et al. | |
| 4,211,730 A | 7/1980 | Vollkommer et al. | |
| 6,028,156 A * | 2/2000 | Peled .................... | C08F 120/06 526/208 |
| 6,180,251 B1 * | 1/2001 | Kanai ...................... | C08K 5/12 428/457 |
| 7,125,923 B2 * | 10/2006 | Geprags ............... | C08K 5/0066 524/310 |
| 8,921,465 B2 | 12/2014 | Hirakawa et al. | |
| 2009/0166576 A1 | 7/2009 | Miyamoto | |
| 2012/0232200 A1 | 9/2012 | Ohtake et al. | |
| 2014/0252265 A1 * | 9/2014 | Gabriel .................. | C08K 3/013 252/75 |
| 2015/0259440 A1 | 9/2015 | Croitoru et al. | |
| 2015/0314495 A1 | 11/2015 | Immel et al. | |
| 2015/0368459 A1 * | 12/2015 | Yamanaka ............... | C08L 51/04 524/504 |
| 2019/0010325 A1 | 1/2019 | Yamanaka et al. | |
| 2021/0047511 A1 | 2/2021 | Goshima et al. | |

FOREIGN PATENT DOCUMENTS

| | | |
|---|---|---|
| CN | 105669885 A | 6/2016 |
| EP | 3 348 616 A1 | 7/2018 |
| EP | 3 770 217 A1 | 1/2021 |
| GB | 2 018 750 A | 10/1979 |
| JP | 2000-313790 A | 11/2000 |
| JP | 2001-261948 A | 9/2001 |
| JP | 2004-91584 A | 3/2004 |
| JP | 2004-277718 A | 10/2004 |
| JP | 2008-156381 A | 7/2008 |
| JP | 2012-201857 A | 10/2012 |
| JP | 2013-57009 A | 3/2013 |
| JP | 2015-212381 A | 11/2015 |
| JP | 2015-532350 A | 11/2015 |
| WO | 2011/148796 A1 | 12/2011 |
| WO | 2015/162609 A1 | 10/2015 |
| WO | 2017/043334 A1 | 3/2017 |
| WO | 2020/100727 A1 | 5/2020 |

OTHER PUBLICATIONS

International Search Report dated Nov. 20, 2018, issued in counterpart application No. PCT/JP2018/030792 (2 pages).
Final Office Action dated Nov. 2, 2021, issued in U.S. Appl. No. 16/981,861. (11 pages).
Extended (Supplementary) European Search Report dated Apr. 29, 2021, issued in counterpart EP Application No. 18848706.0. (8 pages).
International Search Report dated Jun. 18, 2019, issued in International Application No. PCT/JP2019/011671. (counterpart to U.S. Appl. No. 16/981,861) (1 page).
Notice of Reasons for Refusal dated Nov. 26, 2019, issued in JP Patent Application No. 2019-559377, w/English translation. (counterpart to U.S. Appl. No. 16/981,861) (4 pages).
Decision to Grant a Patent dated Mar. 3, 2020, issued in JP Patent Application No. 2019-559377, w/English translation. (counterpart to U.S. Appl. No. 16/981,861) (5 pages).
Extended (Supplementary) European Search Report dated Apr. 23, 2021, issued in EP Application No. 19771376.1. (counterpart to U.S. Appl. No. 16/981,861) (7 pages).

(Continued)

*Primary Examiner* — Jane L Stanley
(74) *Attorney, Agent, or Firm* — WHDA, LLP

(57) ABSTRACT

The present invention addresses the problem of suppressing corrosion of a molding machine or mold when molding a polybutylene terephthalate resin composition that uses a halogenated benzyl acrylate-based flame retardant as a flame retardant and suppressing corrosion of a metal terminal in an insert-molded article that uses the polybutylene terephthalate resin composition. The problem is solved by a polybutylene terephthalate resin composition that uses a halogenated benzyl acrylate-based flame retardant as a flame retardant, wherein the amount of halogenated aromatic compounds such as chlorobenzene in the manufacturing process for the flame retardant is suppressed.

3 Claims, No Drawings

(56) References Cited

OTHER PUBLICATIONS

Non-Final Office Action dated Jul. 19, 2021, issued in U.S. Appl. No. 16/981,861 (10 pages).
Office Action dated Dec. 1, 2021, issued in CN Application No. 201980020178.3 (counterpart to U.S. Appl. No. 16/981,861), with English translation. (12 pages).
Chapter 15 High Performance Liquid Chromatography, Instrumental analysis, pp. 429-432, with English translation, cited in CN Office Action dated Dec. 1, 2021. (8 pages).
Zhao, et al., "Application Manual of coating process", Sinopec Press, 2003, pp. 315-316, with English translation, cited in CN Office Action dated Dec. 1, 2021. (23 pages).
Youk, et al., "Polymerization of Ethylene Terephthalate Cyclic Oligomers with Antimony Trioxide" Macromolecules, 2000, vol. 33, No. 10, pp. 3594-3599, cited in CN Office Action dated Dec. 1, 2021. (6 pages).
Samperi, et al., "Thermal degradation of poly (butylene terephthalate) at the processing temperature", 2004, vol. 83, No. 1, pp. 11-17, cited in CN Office Action dated Dec. 1, 2021. (7 pages).
Peebles, et al., "Isolation and identification of the linear and cyclic oligomers of poly (ethylene terephthalate) and the mechanism of cyclic oligomer formation", Journal of Polymer Science Part A-1, 1969, vol. 7, pp. 479-496, cited in CN Office Action dated Dec. 1, 2021. (18 pages).

\* cited by examiner

FLAME-RETARDANT POLY(BUTYLENE TEREPHTHALATE) RESIN COMPOSITION

TECHNICAL FIELD

The present invention pertains to a flame-retardant polybutylene terephthalate resin composition and a manufacturing method for the same.

BACKGROUND ART

Polybutylene terephthalate resins (PBT resins) have various excellent electrical properties and are therefore widely used as engineering plastics in many applications such as electrical/electronic components. In these applications, flame retardance is demanded of the materials used in order to prevent ignition by tracking and the like. Polybutylene terephthalate resins themselves do not have sufficient flame retardance and are therefore used as flame-retardant resin compositions in which a flame retardant has been added.

Patent Document 1 introduces polypentabromobenzyl acrylate (PBBPA) as a halogenated benzyl acrylate-based flame retardant, which is one kind of flame retardant added to polybutylene terephthalate resins. As a method for manufacturing this flame retardant, paragraph [0004] of Patent Document 1 describes a method for polymerizing pentabromobenzyl acrylate, which is a monomer, in ethylene glycol monomethyl ether, methyl ethyl ketone, or ethylene glycol dimethyl ether and a method for polymerizing the same in chlorobenzene as examples.

When polymerized with, among these, the halogenated aromatic compound chlorobenzene as the solvent, a trace amount of chlorobenzene is ultimately present as an impurity in the PBBPA. In addition, polybutylene terephthalate resin compositions which have been made flame-retardant by adding this also contain chlorobenzene.

Chlorobenzene is generally a stable compound, but when it is in contact with metals such as, in particular, metal oxides or alkali metal-based compounds in high-temperature environments, dechlorination can occur, generating compounds such as hydrogen chloride. Therefore, in molding compositions comprising the same, there are cases of problems such as corrosion of molding machines or molds or corrosion of the terminals of insert-molded articles.

CITATION LIST

Patent Literature

Patent Document 1: JP 2015-532350 A

SUMMARY OF INVENTION

Technical Problem

The present invention addresses the problem of suppressing corrosion of molding machines or molds when molding polybutylene terephthalate resin compositions that use a halogenated benzyl acrylate-based flame retardant as a flame retardant and corrosion of metal terminals in insert-molded articles using the polybutylene resin compositions.

Solution to Problem

Through the process of research addressing the problem of suppressing corrosion of molding machines or molds when molding polybutylene terephthalate resin compositions and corrosion of metal terminals in insert-molded articles using the polybutylene resin compositions, the present inventors found that the problem can be solved by suppressing the amount of halogenated aromatic compounds such as chlorobenzene contained in polybutylene terephthalate resin compositions using a halogenated benzyl acrylate-based flame retardant as a flame retardant, particularly suppressing the amount of halogenated aromatic compounds originating from the manufacturing process for the flame retardant, and completed the present invention.

That is, the present invention pertains to (1)-(9) below.

(1) A flame-retardant polybutylene terephthalate resin composition containing a polybutylene terephthalate resin and a halogenated benzyl acrylate-based flame retardant, the resin composition comprising less than 0.5 ppm of a halogenated aromatic compound other than the flame retardant, as measured by headspace gas chromatography (150° C., 1 hour heating).

(2) The flame-retardant polybutylene terephthalate resin composition described in (1), wherein the halogenated benzyl acrylate-based flame retardant is a brominated acrylic polymer represented by general formula (I), wherein X is a hydrogen atom or a bromine atom, at least one X is bromine, and m is a number from 10 to 2000.

[Chem. 1]

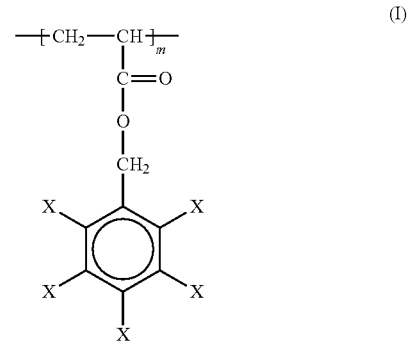

(3) The flame-retardant polybutylene terephthalate resin composition described in (1) or (2), wherein the halogenated benzyl acrylate-based flame retardant is polypentabromobenzyl acrylate.

(4) The flame-retardant polybutylene terephthalate resin composition described in any one of (1) to (3), wherein the halogenated aromatic compound other than the flame retardant is halogenated benzene.

(5) The flame-retardant polybutylene terephthalate resin composition described in any one of (1) to (4), wherein the halogenated aromatic compound other than the flame retardant is chlorobenzene.

(6) A manufacturing method for the flame-retardant polybutylene terephthalate resin composition described in any one of (1) to (5), wherein the halogenated aromatic compound content in a solvent when manufacturing the halogenated benzyl acrylate-based flame retardant is 100 ppm or less.

(7) The manufacturing method for a flame-retardant polybutylene terephthalate resin composition described in (6), wherein a halogenated aromatic compound is not used as the solvent when manufacturing the halogenated benzyl acrylate-based flame retardant.

(8) The manufacturing method for a flame-retardant polybutylene terephthalate resin composition described in (6)

or (7), wherein one or more solvents selected from a group consisting of ethylene glycol monomethyl ether, methyl ethyl ketone, ethylene glycol dimethylether, and dioxane are used as the solvent when manufacturing the halogenated benzyl acrylate-based flame retardant.

(9) The manufacturing method for a flame-retardant polybutylene terephthalate resin composition described in any one of (6) to (8), wherein vacuum drying is performed.

Advantageous Effects of Invention

According to the present invention, in a polybutylene terephthalate resin composition using a halogenated benzyl acrylate-based flame retardant as a flame retardant, by suppressing the amount of halogenated aromatic compounds such as chlorobenzene in the manufacturing process for the flame retardant, corrosion of a molding machine or mold when molding the polybutylene terephthalate resin composition and corrosion of metal terminals in insert-molded articles using the polybutylene terephthalate resin composition can be suppressed.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered.

[Flame-Retardant Polybutylene Terephthalate Resin Composition]

Below, the details of the components of the flame-retardant polybutylene terephthalate resin composition of the present embodiment shall be explained with examples.

(Polybutylene Terephthalate Resins)

Polybutylene terephthalate resins (PBT resins) are obtained by condensation polymerizing a dicarboxylic acid component comprising at least terephthalic acid or an ester-forming derivative thereof (a $C_{1-6}$ alkylester, an acid halide, etc.) and a glycol component comprising an alkylene glycol with a carbon number of at least 4 (1,4-butanediol) or an ester-forming derivative thereof (an acetylate, etc.). In the present embodiment, the polybutylene terephthalate resin is not limited to homopolybutylene terephthalate resins and may be a copolymer containing 60 mol % or more of butylene terephthalate units.

The amount of terminal carboxyl groups of the polybutylene terephthalate resin is not particularly limited so long as the objective of the present invention is not hindered but is preferably 30 meq/kg or less and more preferably 25 meq/kg or less.

The intrinsic viscosity of the polybutylene terephthalate resin is not particularly limited so long as the objective of the present invention is not hindered but is preferably 0.60 dL/g to 1.2 dL/g and more preferably 0.65 dL/g to 0.9 dL/g. When a polybutylene terephthalate resin with an intrinsic viscosity in such a range is used, the obtained polybutylene terephthalate resin composition has particularly excellent moldability. Further, the intrinsic viscosity can be adjusted by blending polybutylene terephthalate resins having different intrinsic viscosities. For example, by blending a polybutylene terephthalate resin with an intrinsic viscosity of 1.0 dL/g with a polybutylene terephthalate resin with an intrinsic viscosity of 0.7 dL/g, a polybutylene terephthalate resin with an intrinsic viscosity of 0.9 dL/g can be prepared. The intrinsic viscosity of the polybutylene terephthalate resin can be measured under conditions of, for example, a temperature of 35° C. in o-chlorophenol.

In preparing the polybutylene terephthalate resin, when using an aromatic dicarboxylic acid or an ester-forming derivative thereof other than terephthalic acid as a comonomer component, for example, a $C_{8-14}$ aromatic dicarboxylic acid such as isophthalic acid, phthalic acid, 2,6-naphthalenedicarboxylic acid, or 4,4'-dicarboxydiphenylether; a $C_{4-16}$ alkanedicarboxylic acid such as succinic acid, adipic acid, azelaic acid, or sebacic acid; a $C_{5-10}$ cycloalkanedicarboxylic acid such as cyclohexanedicarboxylic acid; or an ester-forming derivative of these dicarboxylic acid components (a $C_{1-6}$ alkylester-derivative, an acid halide, etc.) can be used. These dicarboxylic acid components may be used alone or in a combination of two or more.

Among these dicarboxylic acid components, a $C_{8-12}$ aromatic dicarboxylic acid such as isophthalic acid and a $C_{6-12}$ alkanedicarboxylic acid such as adipic acid, azelaic acid, or sebacic acid are more preferred.

In preparing the polybutylene terephthalate resin, when using a glycol component other than 1,4-butanediol as a comonomer component, for example, a $C_{2-10}$ alkylene glycol such as ethylene glycol, propylene glycol, trimethylene glycol, 1,3-butylene glycol, hexamethylene glycol, neopentyl glycol, or 1,3-octanediol, a polyoxyalkylene glycol such as diethylene glycol, triethylene glycol, or dipropylene glycol; an alicyclic diol such as cyclohexanedimethanol or hydrogenated bisphenol A; an aromatic diol such as bisphenol A or 4,4'-dihydroxybiphenyl; a $C_{2-4}$ alkylene oxide adduct of bisphenol A such as an ethylene oxide 2-mol adduct of bisphenol A or a propylene oxide 3-mol adduct of bisphenol A; or an ester-forming derivative of these glycols (an acetlyate, etc.) can be used. These glycol components may be used alone or in a combination of two or more.

Among these glycol components, a $C_{2-6}$ alkylene glycol such as ethylene glycol or trimethylene glycol, a polyoxyalkylene glycol such as diethylene glycol, an alicyclic diol such as cyclohexanedimethanol, etc. is more preferred.

As comonomer components that can be used beyond the dicarboxylic acid component and the glycol component, there are, for example, aromatic hydroxycarboxylic acids such as 4-hydroxybenzoic acid, 3-hydroxybenzoic acid, 6-hydroxy-2-naphthoic acid, and 4-carboxy-4'-hydroxybiphenyl; aliphatic hydroxycarboxylic acids such as glycolic acid and hydroxycaproic acid; $C_{3-12}$ lactones such as propiolactones, butyrolactones, valerolactones, and caprolactones (ε-caprolactone, etc.); and ester-forming derivatives of these comonomer components ($C_{1-6}$ alkylester derivatives, acid halides, acetylates, etc.).

The content of the polybutylene terephthalate resin is preferably 30-90% by mass of the total mass of the resin composition, more preferably 40-80% by mass, and still more preferably 50-70% by mass.

(Halogenated Benzyl Acrylate-Based Flame Retardant)

As examples of the halogenated benzyl acrylate-based flame retardant used in the present invention, there are brominated acrylic polymers represented by general formula (I) below.

[Chem. 2]

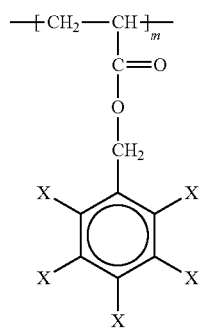

At least one X in the formula is bromine. The number of X is from 1 to 5 in one constituent unit, but in view of the flame retarding effects, 3-5 is preferred. The average degree of polymerization m is 10-2000 and preferably in the range of 15-1000. Thermal stability worsens in flame retardants in which the average degree of polymerization is low and the moldability of the polybutylene terephthalate resin worsens if a flame retardant in which the average degree of polymerization exceeds 2,000 added thereto. Further, one of the above brominated acrylic polymers or a mixture of two or more may be used.

The halogenated benzyl acrylate-based flame retardant used in the present invention can contain, other than the brominated acrylic polymers above, which are flame retardants themselves, halogenated aromatic compounds derived from the solvent when polymerizing or from degradation products of the brominated acrylic polymer as impurities, but the content of halogenated aromatic compounds other than the flame retardant, which are such impurities, is preferably 100 ppm or less, more preferably 50 ppm or less, still more preferably 30 ppm or less, and especially preferably 10 ppm or less. The content of halogenated aromatic compounds other than the flame retardant can be determined from, for example, the amount of gas derived from halogenated aromatic compounds when measuring, with a gas chromatograph, the gas generated when a sample in which the halogenated benzyl acrylate-based flame retardant has been crushed is heat treated in headspace.

The brominated acrylic polymer represented by general formula (I) is obtained by polymerizing, alone, a benzyl acrylate containing bromine, but benzyl methacrylates, etc. with similar structures may be copolymerized. As bromine-containing benzyl acrylates, there are pentabromobenzyl acrylate, tetrabromobenzyl acrylate, tribromobenzyl acrylate, or mixtures thereof. Among these, pentabromobenzyl acrylate is preferred. Moreover, as benzyl methacrylates that are copolymerizable components, there are methacrylates corresponding to the abovementioned acrylates. Furthermore, copolymerization with vinyl-based monomers is possible and examples include acrylic acid esters such as acrylic acid, methyl acrylate, ethyl acrylate, butyl acrylate, and benzyl acrylate, methacrylic acid esters such as methacrylic acid, methyl methacrylate, ethyl methacrylate, butyl methacrylate, and benzyl methacrylate, styrene, acrylonitrile, unsaturated carboxylic acids such as fumaric acid and maleic acid or anhydrides thereof, vinyl acetate, vinyl chloride, etc. Moreover, crosslinkable vinyl-based monomers, xylylene diacrylate, xylylene dimethacrylate, tetrabromoxylylene diacrylate, tetrabromoxylylene dimethacrylate, butadiene, isoprene, and divinylbenzene can also be used. These are used in a molar amount equivalent to or less than and preferably 0.5 molar amount or less that of the benzylacrylate or benzyl methacrylate.

Showing an example of the manufacturing method for the brominated acrylic polymer, there is the method of reacting brominated acrylic monomers at a predetermined degree of polymerization by liquid polymerization or bulk polymerization. In the case of liquid polymerization, it is preferable that a halogenated aromatic compound such as halogenated benzene or chlorobenzene not be used as the solvent. Further, an aprotic solvent such as ethylene glycol monomethyl ether, methyl ether ketone, ethylene glycol dimethyl ether, or dioxane is preferred as the solvent in the case of liquid polymerization.

The abovementioned brominated acrylic polymer is preferably washed in water and/or an aqueous solution containing alkali (earth) metal ions in order to remove reaction byproducts such as residual sodium polyacrylate. The aqueous solution containing alkali (earth) metal ions is easily obtained by putting an alkali (earth) metal salt in water, but a hydroxide which is an alkali (earth) metal that does not comprise chloride ions, phosphate ions, etc. (for example, calcium hydroxide) is optimum. When using, for example, calcium hydroxide as the alkali (earth) metal salt, generally about 0.126 g of calcium hydroxide is soluble in 100 g of water at 20° C. and the concentration of the aqueous solution is not particularly specified as far as the solubility allows. Further, the technique for washing with water and/or the aqueous solution containing alkali (earth) metal ions is not particularly limited and may be a technique such as that for immersing the brominated acrylic polymer in water and/or the aqueous solution containing alkali (earth) metal ions for an appropriate period of time. In the brominated acrylic polymer after the washing process with water and/or the aqueous solution containing alkali (earth) metal ions is complete, the dry solid content in the warm water extraction generally becomes 100 ppm or less and when using such a brominated acrylic polymer, the emergence of foreign matter on the surfaces of molded articles thereof is largely eliminated.

The content of halogenated aromatic compounds other than the flame retardant, which are the aforementioned impurities, in the flame-retardant polybutylene terephthalate resin composition of the present invention is less than 0.5 ppm, preferably 0.3 ppm or less, and more preferably 0.1 ppm or less. Due to the content of halogenated aromatic compounds other than the flame retardant in the flame-retardant polybutylene terephthalate resin composition being in the above range, corrosion of metal terminals in insert-molded articles using the polybutylene terephthalate resin composition can be suppressed. The content of such halogenated aromatic compounds other than the flame retardant can be determined from, for example, the amount of gas derived from halogenated aromatic compounds when measuring, with a gas chromatograph, the gas generated when a sample in which the polybutylene terephthalate resin composition has been crushed is heat treated in headspace.

In making the resin flame-retardant, use together with an antimony-based auxiliary flame retardant is preferred. As representative auxiliary flame retardants, there are antimony trioxide, antimony tetroxide, antimony pentoxide, sodium pyroantimonate, etc. Furthermore, with the objective of preventing the spread of fire due to the resin dripping when burnt, use together with a drip prevention agent such as polytetrafluoroethylene is preferred.

The range of addition of the brominated acrylic polymer and the antimony-based auxiliary flame retardant to the resin is preferably 3-30 parts by mass of the polymer and 1-20 parts by mass of the antimony-based auxiliary flame retardant with respect to 100 parts by mass of the polybutylene terephthalate resin. If the amounts of the brominated acrylic polymer and the antimony-based auxiliary flame retardant are too small, sufficient flame retardance cannot be imparted and, if the amounts added are too large, physical properties as molded articles worsen.

(Filler)

A filler can be used in the composition of the present invention, as necessary. Such a filler is preferably blended in order to obtain excellent properties in performance such as mechanical strength, thermal resistance, dimensional stability, or electrical properties and is particularly effective with the objective of increasing rigidity. In accordance with the objective, a fibrous, granular, or tabular filler is used.

As fibrous fillers, there are glass fibers, asbestos fibers, carbon fibers, silica fibers, silica/alumina fibers, zirconia fibers, boron nitride fibers, silicon nitride fibers, boron fibers, potassium titanate fibers, and further, fibrous materials of metals such as stainless steel, aluminum, titanium, copper, and brass, etc. In addition, high-melting point organic fibrous substances such as polyamides, fluorine resins, and acrylic resins can also be used.

As granular fillers, there are carbon black, quartz powder, glass beads, glass powder, silicates such as calcium silicate, aluminum silicate, kaolin, talc, clay, diatomaceous earth, and wollastonite, metal oxides such as iron oxide, titanium oxide, and alumina, metal carbonates such as calcium carbonate and magnesium carbonate, metal sulfates such as calcium sulfate and barium sulfate, and, additionally, silicon carbide, silicon nitride, boron nitride, various metal powders, etc.

Further, as tabular inorganic fillers, there are mica, glass flakes, various metal foils, etc.

The type of the filler is not particularly limited and one or more types of filler can be added. In particular, using potassium titanate fibers, mica, talc, or wollastonite is preferred.

The amount of the filler added is not particularly specified, but is preferably 200 parts by mass or less with respect to 100 parts by mass of the polybutylene terephthalate resin. When the filler is added in excess, inferior moldability and decreases in toughness are observed.

(Additives)

Furthermore, in order to impart desired properties other than flame retardance, publicly known substances generally added to thermoplastic resins and the like can be added in combination to the composition of the present invention in accordance with the objective thereof. Any of, for example, an antioxidant, an ultraviolet absorbing agent, a stabilizer such as a photostabilizer, an anti-static agent, a lubricant, a mold release agent, a colorant such as a dye or pigment, a plasticizing agent, etc. can be blended. In order to improve thermal resistance, in particular, the addition of an antioxidant is effective.

[Manufacturing Method for the Flame-Retardant Polybutylene Terephthalate Resin Composition]

The form of the flame-retardant polybutylene terephthalate resin composition of the present invention may be a granular mixture and may be a molten mixture (melt-kneaded article) such as pellets. The manufacturing method for the polybutylene terephthalate resin composition of one embodiment of the present invention is not particularly limited and the composition can be manufactured with equipment and methods known in the technical field. For example, the composition can be prepared as pellets for molding by mixing the necessary components and kneading using a single-screw or twin-screw extruder or other melt-kneading device. Multiple extruders or other melt-kneading devices may be used. Further, all the components may be simultaneously charged from a hopper or some components may be charged from a side feed port.

Moreover, the flame-retardant polybutylene terephthalate resin composition of the present invention is preferably manufactured by vacuum drying (vacuum drawing). Generally used evaporators, ovens, etc. can be used in vacuum drying.

EXAMPLES

The present invention will be explained specifically with the following examples, but the present invention is not limited by these examples so long as the gist thereof is not exceeded. Evaluation of the properties was carried out with the following method.

(1) Halogenated Aromatic Compound Content

Materials in which the components shown in Table 1 were dry-blended at the compositions (parts by mass) shown therein were supplied to a twin-screw extruder having ø 30 mm screws (manufactured by The Japan Steel Works, Ltd.) and melt-kneaded at 260° C., and crushed pellets of the obtained polybutylene terephthalate resin composition were made into samples. 5 g of the samples were taken and, after being left for one hour at 150° C. in 20 ml of headspace, using an HP5890A manufactured by Yokogawa-Hewlett-Packard, Ltd. as the device and HR-1701 (0.32 mm diameter×30 m) as the column, held at 50° C. for 1 minute, then the temperature raised at 5° C./minute, the amount of generated gas derived from halogenated aromatic compounds was measured with a gas chromatograph, and the content of the halogenated aromatic compounds was shown in ppm. The results are shown in Table 1.

(2) Metal Corrosion

Materials in which the components shown in Table 1 were dry-blended at the compositions (parts by mass) shown therein were supplied to a twin-screw extruder having ø 30 mm screws (manufactured by The Japan Steel Works, Ltd.) and melt-kneaded at 260° C. and 50 g pellets of the obtained polybutylene terephthalate resin compositions were placed together with a 1 cm×1 cm silver plate in 300 ml glass bottles with ground-in stoppers and the bottles stoppered, and after being left for 500 hours in a 150° C. gear oven, the surfaces of the silver plates were confirmed by visual observation and those in which corrosion did not occur evaluated as ○ and those in which corrosion did occur evaluated as x. The results are shown in Table 1.

(3) Flame Retardance

Materials in which the components shown in Table 1 were dry-blended at the compositions (parts by mass) shown therein were supplied to a twin-screw extruder having ø 30 mm screws (manufactured by The Japan Steel Works, Ltd.) and melt-kneaded at 260° C. and pellets of the obtained polybutylene terephthalate resin composition, after being dried for 3 hours at 140° C., were injection molded at a cylinder temperature of 250° C. and a mold temperature of 70° C., test pieces with a thickness of 1/32 inches fabricated in conformance with UL94, and the flammability evaluated. The results are shown in Table 1.

TABLE 1

|  | Example 1 | Comparative Example 1 |
| --- | --- | --- |
| PBT Resin | 100 parts by mass | 100 parts by mass |
| Flame Retardant 1 | 18.8 parts by mass |  |
| Flame Retardant 2 |  | 18.8 parts by mass |
| Auxiliary Flame Retardant | 9.4 parts by mass | 9.4 parts by mass |
| Drip Prevention Agent | 0.7 parts by mass | 0.7 parts by mass |
| Antioxidant | 0.4 parts by mass | 0.4 parts by mass |
| Mold Release Agent | 1.6 parts by mass | 1.6 parts by mass |
| Halogenated Aromatic Compound Content | N.D. | 1.5 ppm |
| Metal Corrosion | ○ | x |
| Flame Retardance | V-0 | V-0 |

In the table, N.D. indicates that the value was below the detection limit (0.1 ppm).

The details of each component described in Table 1 are as described below.

PBT Resin: Polybutylene terephthalate resin with a terminal carboxyl group concentration of 18 meq/kg and an intrinsic viscosity of 0.88 dL/g manufactured by WinTech Polymer Ltd.

Flame Retardant 1: Polypentabromobenzyl acrylate polymerized by using ethylene glycol monomethyl ether as the solvent (8 ppm content of halogenated aromatic compounds other than the flame retardant)

Flame Retardant 2: Polypentabromobenzyl acrylate polymerized by using chlorobenzene as the solvent (150 ppm content of halogenated aromatic compounds other than the flame retardant)

Auxiliary Flame Retardant: Antimony trioxide

Drip Prevention Agent: Polytetrafluoroethylene

Antioxidant:

Tetrakis[methylene-3-(3,5-di-t-butyl-4-hydroxyphenyl) proprionate]methane ("Irganox 1010" manufactured by BASF Japan Ltd.)

Mold Release Agent: Low molecular weight polyethylene ("Sanwax 161-P" manufactured by Sanyo Chemical Industries, Ltd.)

The invention claimed is:

1. A manufacturing method for the flame-retardant polybutylene terephthalate resin composition, the flame-retardant polybutylene terephthalate resin composition comprising a polybutylene terephthalate resin and a halogenated benzyl acrylate-based flame retardant, the resin composition comprising less than 0.5 ppm of a halogenated aromatic compound other than the flame retardant, as measured by headspace gas chromatography, 150° C., 1 hour heating, wherein the halogenated benzyl acrylate-based flame retardant is a brominated acrylic polymer represented by general formula (I), wherein X is a hydrogen atom or a bromine atom, at least one X is bromine, and m is a number from 10 to 2000

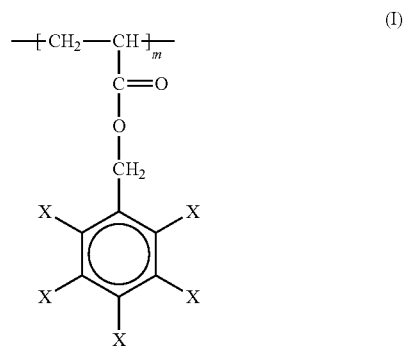

the method comprising the step of reacting brominated acrylic monomers at a predetermined degree of polymerization by liquid polymerization, wherein the halogenated aromatic compound content in a solvent for the liquid polymerization is 100 ppm or less, wherein one or more solvents selected from a group consisting of ethylene glycol monomethyl ether, methyl ethyl ketone, ethylene glycol dimethylether, and dioxane are used as the solvent when manufacturing the halogenated benzyl acrylate-based flame retardant.

2. The manufacturing method for a flame-retardant polybutylene terephthalate resin composition according to claim 1, wherein a halogenated aromatic compound is not used as the solvent when manufacturing the halogenated benzyl acrylate-based flame retardant.

3. The manufacturing method for a flame-retardant polybutylene terephthalate resin composition according to claim 1, wherein vacuum drying is performed.

* * * * *